United States Patent [19]

Seelmann-Eggebert et al.

[11] Patent Number: 5,104,951
[45] Date of Patent: Apr. 14, 1992

[54] WATER-SOLUBLE COPOLYMERS AND THEIR PREPARATION

[75] Inventors: Hans-Peter Seelmann-Eggebert, Schriesheim; Dieter Boeckh; Heinrich Hartmann, both of Limburgerhof; Wolfgang Trieselt, Ludwigshafen; Richard Baur, Mutterstadt, all of Fed. Rep. of Germany

[73] Assignee: BASF Aktiengesellschaft, Ludwigshafen, Fed. Rep. of Germany

[21] Appl. No.: 707,305

[22] Filed: May 29, 1991

Related U.S. Application Data

[63] Continuation of Ser. No. 359,264, May 31, 1989, abandoned.

[30] Foreign Application Priority Data

May 31, 1988 [DE] Fed. Rep. of Germany ....... 3818426

[51] Int. Cl.$^5$ .................... C08F 30/04; C08F 210/02
[52] U.S. Cl. .................... 526/240; 526/318.3; 526/318.2; 526/304; 526/318.42; 526/318.5
[58] Field of Search ............ 526/318.3, 240, 318.2, 526/304, 318.42, 318.5

[56] References Cited

U.S. PATENT DOCUMENTS

| | | |
|---|---|---|
| 2,768,991 | 10/1956 | Schnell . |
| 2,884,336 | 4/1959 | Loslack et al. .............. 526/240 |
| 3,137,660 | 6/1964 | Jones .......................... 526/238.2 |
| 3,769,254 | 10/1973 | Anderson et al. ............ 526/87 |
| 4,267,103 | 5/1981 | Cohen ......................... 526/208 |
| 4,897,458 | 1/1990 | Seelmann-Eggebert et al. .... 526/318.3 |
| 4,914,172 | 4/1990 | Seelmann-Eggebert et al. .... 526/318.3 |

FOREIGN PATENT DOCUMENTS 3514364 6/1987 Fed. Rep. of Germany .

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Water-soluble polymers having K values of from 5 to 100 (determined on the Na salt of the polymers according to H. Fikentscher in aqueous solution at 25° C., a pH of 7 and a concentration of 1% by weight of the Na salt of the polymer) are prepared by polymerizing a monomer mixture of (a) monethylenically unsaturated $C_3$–$C_8$-monocarboxylic acids and (b) more than 20–100 mol % of monomers which have two or more ethylenically unsaturated double bonds linked via one or more ester or amide functions and which contain one or more —CO—OX groups, where X is one hydrogen equivalent, one alkali metal equivalent or one alkaline earth metal equivalent or an ammonium group, in aqueous solution in the presence of a polymerization initiator, and the polymers are used in amounts of from 0.5 to 25% by weight in detergents and cleaners.

4 Claims, No Drawings

WATER-SOLUBLE COPOLYMERS AND THEIR PREPARATION

This application is a continuation of application Ser. No. 07/359,264, filed May 31, 1989, now abandoned.

U.S. patent application Ser. No. 07/179,049, now U.S. Pat. No. 4,897,458, describes water-soluble copolymers which have a K value of 15 to 120 (determined on the sodium salt according to H. Fikentscher in aqueous solution at 25° C., a pH of 7 and a concentration of 1% by weight of the Na salt of the polymer) and contain a) from 99.5 to 80 mol % of one or more ethylenically unsaturated $C_3-C_6$-monocarboxylic acids and b) from 0.5 to 20 mol % of one or more comonomers which have two or more ethylenically unsaturated, nonconjugated double bonds and one or more —CO—OX groups, where X is one hydrogen equivalent, one alkali metal equivalent or one alkaline earth metal equivalent or an ammonium group, as copolymerized units, with the proviso that the sum of the mol % of a) and b) is always 100. The polymerized comonomer (b) is obtainable by reacting b1) maleic anhydride, itaconic anhydride, citraconic anhydride or a mixture of these with b2) a polyhydric alcohol of 2 to 6 carbon atoms, a water-soluble or water-insoluble polyalkylene glycol having a molecular weight of up to about 400, a water-soluble polyalkylene glycol having a molecular weight of from more than about 400 to 10,000, a polyglycerol having a molecular weight of up to 2,000, a polyamine, a polyalkylenepolyamine, a polyethyleneimine, an aminoalcohol, a hydroxaminocarboxylic acid, a hydroxydiaminocarboxylic acid, a water-soluble copolymer of ethylene oxide and carbon dioxide, polyvinylalcohol having a molecular weight of up to 10,000, allyl alcohol, allylamine, a hydroxyalkyl ester, where the hydroxyalkyl group is of 2 to 6 carbon atoms, of a monoethylenically unsaturated $C_3-C_6$-carboxylic acid or of a saturated $C_3-C_6$-hydroxycarboxylic acid, or a mixture of these.

U.S. patent application Ser. No. 07/179,477, now U.S. Pat. No. 4,914,172, discloses water-soluble copolymers which have a K value of from 8 to 100 (determined on the Na salt according to H. Fikentscher in aqueous solution at 25° C., a pH of 7 and a concentration of 1% by weight of the Na salt of the polymer) and contain a) from 99 to 15 mol % of one or more monoethylenically unsaturated $C_3-C_6$-monocarboxylic acids, b) from 0.5 to 84.5 mol % of one or more monoethylenically unsaturated $C_3-C_6$-dicarboxylic acids, c) from 0 to 20 mol % of one or more hydroxyalkyl esters, where the hydroxyalkyl group is of 2 to 6 carbon atoms, of monoethylenically unsaturated $C_3-C_6$-carboxylic acids, d) from 0 to 30 mol % of other water-soluble, monoethylenically unsaturated monomers copolymerizable with a), b) and c), and e) from 0.5 to 15 mol % of one or more comonomers which have two or more ethylenically unsaturated, nonconjugated double bonds and one or more —CO—OX groups, where X is one hydrogen equivalent, one alkali metal equivalent or one alkaline earth metal equivalent or an ammonium group, as copolymerized units, with the proviso that the sum of the mol % of a) to e) is always 100.

It is an object of the present invention to modify the properties of the polymers disclosed in the abovementioned patent applications.

We have found that this object is achieved, according to the invention, by a process for the preparation of water-soluble polymers having a K value of from 5 to 100 (determined on the Na salt of the polymer according to H. Fikentscher in aqueous solution at 25° C., a pH of 7 and a concentration of 1% by weight of the Na salt of the polymer) by polymerizing a monomer mixture of a) monoethylenically unsaturated $C_3-C_6$-monocarboxylic acids and b) monomers which contain two or more ethylenically unsaturated double bonds linked via one or more ester or amide functions and which possess two or more —CO—OX groups, where X is one hydrogen equivalent, one alkali metal equivalent or one alkaline earth metal equivalent or an ammonium group, in aqueous solution in the presence of a polymerization initiator at not more than 200° C., if a monomer mixture which contains more than 20 to 100 mol % of (b) is polymerized in the presence of not more than 50% by weight, based on the monomers used, of a polymerization initiator.

The polymers are further modified by a procedure in which the polymerization is additionally carried out in the presence of monomers from the groups (c) from 0 to 79.9 mol % of monoethylenically unsaturated $C_4-C_6$-dicarboxylic acids, (d) from 0 to 20 mol % of hydroxyalkyl esters, where the hydroxyalkyl group is of 2 to 6 carbon atoms, of monoethylenically unsaturated $C_3-C_6$-carboxylic acids, (e) from 0 to 30 mol % of other water-soluble, monoethylenically unsaturated monomers copolymerizable with monomers of groups (a) to (d) and (f) from 0 to 10 mol % of monomers which have two or more ethylenically unsaturated nonconjugated double bonds and differ from the monomers (b), the sum of the mol % for (a) to (f) always being 100 and one or more of the components (c) to (f) being present in the monomer mixture in an amount of 0.1 mol %.

Suitable components a) of the water-soluble copolymers are monoethylenically unsaturated $C_3-C_6$-monocarboxylic acids. Examples of suitable carboxylic acids of this type are acrylic acid, methacrylic acid, ethacrylic acid, vinylacetic acid, allylacetic acid and crotonic acid. Preferably used monomers of component a) are acrylic acid and/or methacrylic acid. The monomers of component a) are present in the monomer mixture in an amount of from 0 to 79.9, preferably from 10 to 75, mol %.

The monomers of component b) are important constituents of the polymers. These are monomers which have two or more ethylenically unsaturated, nonconjugated double bonds linked via one or more ester or amide functions and which possess one or more —CO—OX groups and/or their salt with an alkali metal, ammonium or alkaline earth metal base. These monomers are present in the monomer mixture in an amount of more than 20–100, preferably 25–90, mol %, ie. they can also be polymerized to give homopolymers.

The monomers b) are obtainable by reacting b1) maleic anhydride, itaconic anhydride, citraconic anhydride or a mixture of these with b2) a polyhydric alcohol of 2 to 6 carbon atoms, a water-soluble or water-insoluble polyalkylene glycol having a molecular weight of up to about 400, a water-soluble polyalkylene glycol having a molecular weight of from more than about 400 to 10,000, a polyglycerol having a molecular weight of up to 2,000, a diamine, a polyalkylenepolyamine, a polyethyleneimine, an aminoalcohol, a hydroxyaminodicarboxylic acid, a hydroxydiaminocarboxylic acid, in particular lysine and serine, a water-soluble copolymer of ethylene oxide and carbon dioxide, polyvinyl alcohol having a molecular weight of up to 10,000, allyl alcohol, allylamine, a hydroxyalkyl ester, where the hydroxyalkyl group is of 2 to 6 carbon atoms, of a monoethylenically unsaturated $C_3$–$C_6$-carboxylic acid or of a saturated $C_3$–$C_6$ hydroxycarboxylic acid, or a mixture of these.

Polyhydric alcohols of 2 to 6 carbon atoms are, for example, glycol, glycerol, pentaerythritol and monosaccharides, such as glucose, mannose or galactose, uronic acids, such as galacturonic acid, and sugar acids, such as mucic acid or galactonic acid.

Water-soluble polyalkylene glycols are the adducts of ethylene oxide, propylene oxide, n-butylene oxide and isobutylene oxide, or a mixture of these, with polyhydric alcohols of 2 to 6 carbon atoms, for example the adducts of ethylene glycol with glycol, adducts of ethylene glycol with glycerol, adducts of ethylene oxide with pentaerythritol, adducts of ethylene oxide with monosaccharides and adducts of mixtures of the stated alkylene oxides with polyhydric alcohols. These adducts may be block copolymers of ethylene oxide and propylene oxide, of ethylene oxide and butylene oxides or of ethylene oxide, propylene oxide and butylene oxides. In addition to the block copolymers, adducts which are random copolymers of the stated alkylene oxides are also suitable.

The molecular weight of the polyalkylene glycols is advantageously up to 5,000, preferably up to 2,000. The water-soluble polyalkylene glycols used are preferably diethylene glycol, triethylene glycol, tetraethylene glycol and polyethylene glycol having a molecular weight of up to 1,500.

Other suitable components b2) are polyglycerols having a molecular weight of up to 2,000. Among this class of substances, diglycerol, triglycerol and tetraglycerol are preferably used.

Examples of preferred polyamines are diamines, such as ethylenediamine, 1,3-propylenediamine, 1,4-butylenediamine, 1,6-hexamethylenediamine and melamine. Examples of suitable polyalkylenepolyamines are diethylenetriamine, triethylenetetramine, pentaethylenehexamine, N-(3-aminopropyl)-1,3-propanediamine and 3-(2-aminoethyl)-aminopropylamine. Particularly suitable polyethyleneimines have a molecular weight of up to 5,000.

Further suitable components b2) are aminoalcohols, such as ethanolamine, 2-aminopropan-1-ol, neopentanolamine and 1-methylaminopropan-2-ol.

Other suitable components b2) are water-soluble copolymers of ethylene oxide and carbon dioxide, which are obtainable by copolymerization of ethylene oxide and carbon dioxide. Polyvinyl alcohols having a molecular weight of up to 10,000, preferably up to 6,000, are also suitable. The polyvinyl alcohols, which are prepared by hydrolysis of polyvinyl acetate, may be completely or partially hydrolyzed. Other suitable compounds of component b2) are lysine, serine, allyl alcohol, allylamine and hydroxyalkyl esters, where the hydroxyalkyl group is of 2 to 6 carbon atoms, of monoethylenically unsaturated $C_3$–$C_6$-mono- and dicarboxylic acids. Hydroxyalkyl esters of saturated $C_3$–$C_6$-hydroxycarboxylic acids, such as glycol (mono)hydroxyacetate, glycol (mono)lactate and neopentylglycol (mono)-hydroxypivalate, are also suitable.

Monomers b) obtained from maleic anhydride and ethylene glycol, polyethylene glycol having a molecular weight of up to 2,000, glycerol, diglycerol, triglycerol, tetraglycerol and polyglycerols having a molecular weight of up to 2,000, pentaerythritol, monosaccharides, neopentylglycol, $\alpha,\omega$-diamines of 2 to 6 carbon atoms, $\alpha,\omega$-diols of 3 to 6 carbon atoms and neopentylglycol hydroxypivalate are preferably used. Monomers b) which are derived from polyethylene glycol and $\alpha,\omega$-diols can be represented, for example, by the following formula

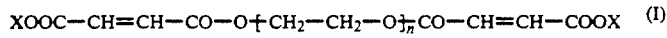

$$\text{XOOC—CH=CH—CO—O}\!\!+\!\!\text{CH}_2\text{—CH}_2\text{—O}\!\!\frac{}{n}\text{CO—CH=CH—COOX} \quad (I)$$

where X is H, an alkali metal or an ammonium group and n is from 1 to 120, preferably not more than 50.

Monomers b) which, for example, are formed by reacting maleic anhydride with an $\alpha,\omega$-diamine can be represented, for example, by the following formula

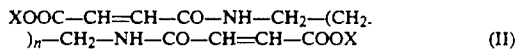

$$\text{XOOC—CH=CH—CO—NH—CH}_2\text{—(CH}_2\text{—)}_n\text{—CH}_2\text{—NH—CO—CH=CH—COOX} \quad (II)$$

where X is H, an alkali metal or an ammonium group and n is from 0 to 4.

Monoethylenically unsaturated $C_4$–$C_6$-dicarboxylic acids are used as monomers for component c). These are, for example, maleic acid, itaconic acid, citraconic acid, mesaconic acid, fumaric acid and methylenemalonic acid. Maleic acid and itaconic acid are preferably used as monomer c). The monomers c) are present in an amount of from 0 to 79.9 mol % in the monomer mixture used for polymerization. If monomers of group (c) are used, the monomer mixture preferably contains from 1 to 65 mol % of these monomers.

The copolymers may contain hydroxyalkyl esters, where the hydroxyalkyl group is of 2 to 6 carbon atoms, of monoethylenically unsaturated $C_3$–$C_6$-carboxylic acids as copolymerized component d). The hydroxyalkyl ester groups of this group of monomers are derived from polyhydric alcohols, eg. glycol, glycerol, propane-1,2-diol, propane-1,3-diol, butane-1,4-diol, butane-1,3-diol, butane-2,3-diol, mixtures of the butanediols or propanediols, hexane-1,6-diol and neopentylglycol. The polyhydric alcohols are esterified with monoethylenically unsaturated $C_3$–$C_6$-carboxylic acids. These are the carboxylic acids stated above under a) and b). Examples of suitable components c) are thus hydroxyethyl acrylate, hydroxyethyl methacrylate, hydroxy-n-propyl methacrylate, hydroxy-n-propyl acrylate, hydroxyisopropyl acrylate, hydroxyisopropyl methacrylate, hydroxy-n-butyl acrylate, hydroxyisobutyl acrylate, hydroxy-n-butyl methacrylate, hydroxyisobutyl methacrylate, hydroxyethyl monomaleate, hydroxyethyl dimaleate, hydroxypropyl monomaleate, hydroxypropyl dimaleate, hydroxy-n-butyl monomaleate, hydroxy-n-butyl dimaleate and hydroxyethyl monoitaconate. Suitable hydroxyalkyl esters of the monoethylenically unsaturated dicarboxylic acids are both the monoesters and the diesters of the dicarboxylic acids with the abovementioned polyhydric alcohols.

Preferably used components d) are hydroxyethyl acrylate, hydroxyethyl methacrylate, butane-1,4-diol monoacrylate and the industrial mixtures of hydroxypropyl acrylates. The isomer mixtures consisting of 2-hydroxy -1-propyl acrylate and 1-hydroxy-2-propyl acrylate are of particular industrial importance. These hydroxyalkyl acrylates are prepared by reacting acrylic acid with propylene oxide. The monomers of group d) are present in the monomer mixture in an amount of from 0 to 20, preferably from 1 to 15, mol %.

The copolymers may contain monomers of group (e) as further copolymerized components. These are other water-soluble monoethylenically unsaturated monomers copolymerizable with a), b), c) and d). Suitable monomers of this type are, for example, acrylamide, methacrylamide, 2-acrylamido-2-methylpropanesulfonic acid, vinylsulfonic acid, allylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methyl-2-imidazoline, vinyl acetate and mixtures of the stated monomers. Those monomers of this group which contain acid groups can be used in the copolymerization in the form of the free acid groups or in a form partially or completely neutralized with an alkali metal base or an ammonium base. The basic acrylates, such as diethylaminoethyl acrylate, are quaternized or neutralized with acids and then subjected to the copolymerization. A particularly preferred monomer of group (e) is vinyl acetate. The monomers of group (e) are present in an amount of from 0 to 30 mol % in the monomer mixture which is polymerized. If monomers of this group are used, the amount preferably employed in the monomer mixture is from 1 to 25 mol %.

Comonomers f) used are compounds which have two or more ethylenically unsaturated double bonds and are not covered by the definition of the compounds of group b). Examples of suitable comonomers f) are N,N'-methylenebisacrylamide, polyethylene glycol diacrylates and polyethylene glycol dimethacrylates, each of which is derived from a polyethylene glycol having a molecular weight of from 106 to 4,000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane, which adducts are diesterified or triesterified with acrylic acid or methacrylic acid, and polyhydric alcohols, such as glycerol or pentaerythritol, which are diesterified or polyesterified with acrylic acid or methacrylic acid, and triallylamine, tetraallylethylenediamine, divinylbenzene, diallyl phthalate, polyethylene glycol divinyl ether, trimethylolpropane diallyl ether, butanediol divinyl ether, pentaerythritol triallyl ether and/or divinylethyleneurea. Preferably used water-soluble comonomers f) are, for example, N,N'-methylenebisacrylamide, polyethylene glycol diacrylates, polyethylene glycol dimethacrylates, pentaerythritol triallyl ether and/or divinylurea.

The comonomers of group f) are present in the monomer mixture in amounts of from 0 to 10 mol %. If comonomers of group f) are used in the polymerization, from 0.1 to 6 mol % of these comonomers are preferably employed.

The water-soluble polymers are prepared by polymerization of the monomer mixtures stated under (a) to (f) or of monomers of group (b) in an organic/aqueous, preferably purely aqueous, medium. The polymerization can be carried out by various processes, for example by a batchwise procedure using aqueous monomer solutions. It is also possible initially to take some of the monomers and some of the initiator in the polymerization reactor and to heat these to the polymerization temperature under an inert ga atmosphere and then to add the remaining monomers and the initiator to the reactor at the rate at which the polymerization proceeds. The polymerization temperatures are from 20° to 200° C., preferably from 50° to 150° C. At above 100° C., pressure apparatuses are preferably used.

In a preferred embodiment of the preparation process, the monomer b) is first prepared by a procedure in which b1) maleic anhydride, itaconic anhydride, citraconic anhydride or a mixture of these is initially taken in a reactor and is reacted therein with b2) a polyhydric alcohol of 2 to 6 carbon atoms, a water-soluble or water-insoluble polyalkylene glycol having a molecular weight of up to about 400, a water-soluble polyalkylene glycol having a molecular weight of from more than about 400 to 10,000, a polyglycerol having a molecular weight of up to 2,000, a diamine, a polyalkylenepolyamine, a polyethyleneimine, an aminoalcohol, lysine, serine, a water-soluble copolymer of ethylene oxide and carbon dioxide, polyvinyl alcohol having a molecular weight of up to 10,000, allyl alcohol, allylamine, a hydroxyalkyl ester, where the hydroxyalkyl group is of 2 to 6 carbon atoms, of a monoethylenically unsaturated $C_3$–$C_6$-carboxylic acid or of a saturated $C_3$–$C_6$-hydroxycarboxylic acid, or a mixture of these, at from 50° to 200° C. This reaction is preferably carried out in the absence of water, although small amounts of water do not present problems when the component b1) is used in an appropriate excess. Instead of the compounds stated under b1), however, it is also possible to use the mono- or diesters of these compounds with $C_1$–$C_4$-alcohols. In these cases, a transesterification or amidation is carried out and the $C_1$–$C_4$-alcohol formed is preferably distilled off from the reaction mixture. When amino-containing compounds stated under b2) are used, the reaction with the mono- or diesters of the anhydrides according to b1) gives the corresponding amides. If esters of component b1) are used in the preparation of the comonomers b), these are preferably dimethyl maleate, monomethyl maleate, dimethyl itaconate, monoisopropyl maleate and diisopropyl maleate. Conventional esterification catalysts may be concomitantly used.

Not less than 0.5 mole of a compound of component b1) is used per mole of the compounds b2). The temperature in the reaction is preferably from 50° to 150° C. The reaction is continued until virtually a quantiative conversion of the components b2) is obtained. Component b1), which is usually used in excess, can remain in the reaction mixture after the end of the preparation of the monomer. In this case, the comonomer can be dissolved in a monoethylenically unsaturated $C_3$–$C_6$-monocarboxylic acid according to a) and then subjected to the copolymerization together with the uncoverted part of the components B1) and the remaining monomers. Since the copolymerization is carried out in aqueous medium, the excess dicarboxylic anhydride b1) still present in the comonomer is hydrolyzed to the corresponding dicarboxylic acid. This dicarboxylic acid should then be regarded as comonomer c).

The initially prepared comonomer b), which still contains excess dicarboxylic anhydride, can however also remain in the reaction mixture in which it has been prepared an can be dissolved therein initially by adding water or dilute aqueous sodium hydroxide solution. During this procedure, the dicarboxylic anhydride still present is hydrolyzed. This monomer mixture is then copolymerized by adding the remaining monomers. The copolymerization of the monomers a) to f) is carried out at a pH of the aqueous solution of from 2 to 9, preferably from 3 to 7. The monomers a), b) and c), each of which contains carboxylic acid groups, can be copolymerized in the form of the free carboxylic acids or in neutralized partially partly neutralized, form the degree of neutralization being from 0 to 100, preferably from 40 to 90, mol %. The neutralization is preferably carried out with alkali metal or ammonium bases. These include, for example, sodium hydroxide solution, potassium hydroxide solution, sodium carbonate, potassium carbonate or ammonium bases, such as ammonia, $C_1$–$C_{18}$-alkylamines, dialkylamines, such as dimethylamine, di-n-butylamine, dihexylamine, tertiary amines, such as trimethylamine, triethylamine, tributylamine or triethanolamine, quarternized nitrogen bases, eg. tetramethylammonium hydroxide, trimethyllaurylammonium hydroxide and trimethylbenzylammonium hydroxide. Sodium hydroxide solution, potassium hydroxide solution or ammonia is preferably used for neutralization. However, neutralization may also be effected with alkaline earth metal bases, eg. calcium hydroxide or $MgCO_3$.

Preferably used polymerization initiators are water-soluble compounds which form free radicals, for example hydrogen peroxide, peroxydisulfates and mixtures of hydrogen peroxide and peroxydisulfates. Examples of suitable peroxydisulfates are lithium peroxydisulfate, sodium peroxydisulfate, potassium peroxydisulfate and ammonium peroxydisulfate. In the case of mixtures of hydrogen peroxide and peroxydisulfate, it is possible to use any desired ratio, hydrogen peroxide and peroxydisulfate preferably being used in a weight ratio of from 3:1 to 1:3. Mixtures of hydrogen peroxide and sodium peroxydisulfate are preferably used in a weight ratio of 1:1. The abovementioned water-soluble polymerization initiators may also be used in combination with reducing agents, eg. iron(II) sulfate, sodium sulfite, sodium hydrogen sulfite, sodium dithionite, triethanolamine and ascorbic acid, in the form of the redox initiators. Examples of suitable water-soluble organic peroxides are acetylacetone peroxide, methyl ethyl ketone peroxide, tert-butyl hydroperoxide and cumene hydroperoxide. The water-soluble organic peroxides can also be used with the abovementioned reducing agents. Other water-soluble polymerization initiators are azo initiators, eg. 2,2'-azobis-(2-amidinopropane) dihydrochloride, 2,2'-azobis-(N,N'-dimethylene)-isobutyramidine dihydrochloride, 2-(carbamylazo)-isobutyronitrile and 4,4'-azobis-(4-cyanovaleric acid). The polymerization can also be initiated using water-insoluble initiators, such as dibenzoyl peroxide, dicyclohexyl peroxydicarbonate, dilauryl peroxide or azobisisobutyronitrile.

The initiators are used in amounts of from 0.5 to 50, preferably from 0.5 to 30, % by weight, based on the sum of the monomers used in the polymerization. The polymerization initiators can be added to the polymerization mixture either together with the monomers or separately from these, continuously or batchwise.

The polymerization may be carried out in the presence of regulators. Water-soluble compounds which either are infinitely miscible with water or have a solubility of more than 5% by weight therein at 20° C. are preferably used for this purpose. Examples of compounds of this type are aldehydes of 1 to 4 carbon atoms, such as formaldehyde, acetaldehyde, propionaldehyde, n-butyraldehyde, isobutyraldehyde, formic acid, ammonium formate, hydroxylammonium salts, in particular hydroxylammonium sulfate, SH-containing compounds of not more than 6 carbon atoms, such as thioglycollic acid, mercaptoalcohols, such as mercaptoethanol, mercaptopropanol, mercaptobutanols and mercaptohexanol, monohydric and polyhydric alcohols of not more than 6 carbon atoms, such as isopropanol, glycol, glycerol and isobutanol. Preferred regulators are water-soluble mercaptans, ammonium formate and hydroxylammonium sulfate. The regulators can be used in amounts of from 0 to 25% by weight, based on the sum of the monomers used in the polymerization. The particularly effective regulators, which are preferred, are employed in amounts of not more than 15% by weight. If the process is carried out in the presence of regulators, the minimum amount used is 0.2% by weight, based on the monomers to be polymerized.

Monomer mixtures of
a) from 79.9 to 10 mol % of acrylic acid and/or methacrylic acid,
b) from 20.1 to 90 mol % of a compound of the formula

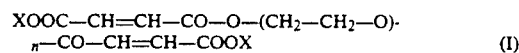

where X is H, an alkali metal or an ammonium group and n is from 1 to 120, and
c) from 0 to 69.9 mol % of maleic acid are preferably polymerized in the novel process, in the presence of not more than 30% by weight, based on the monomers used, of a polymerization initiator. The polymerization of monomer mixtures of
a) from 79.9 to 10 mol % of acrylic acid and/or methacrylic acid,
b) from 20.1 to 90 mol % of a compound of the formula

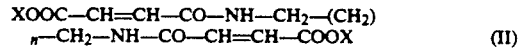

where X is H, an alkali metal or an ammonium group and n is from 0 to 4, and
c) from 0 to 69.9 mol % of maleic acid is also preferred.

The sum of the mol % of a) to c) is 100 in each case.

Surprisingly, water-soluble copolymers are also obtained when monomer mixtures of
a) from 79.9 to 10 mol % of acrylic acid and/or methacrylic acid,
b) from 20.1 to 90 mol % of a compound of the formula

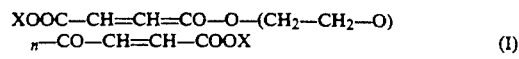

where X is H, an alkali metal or an ammonium group and n is from 0 to 4, c) from 0 to 69.9 mol % of maleic acid and f) from 0.5 mol % of comonomers which are obtainable by esterifying f$_1$) acrylic acid and/or methacrylic acid with f$_2$) a polyhydric alcohol of 2 to 6 carbon atoms, a polyalkylene glycol having a molecular weight of up to 4,000, a polyglycerol having a molecular weight of up to 2,000, an aminoalcohol, a hydroxyaminodicarboxylic acid, a hydroxydiaminocarboxylic acid, a water-soluble copolymer of ethylene oxide and carbon dioxide, allyl alcohol, a hydroxyalkyl ester, where the hydroxyalkyl group is of 2 to 6 carbon atoms, of a monoethylenically unsaturated $C_3$–$C_6$-carboxylic acid or of a saturated $C_3$–$C_6$-hydroxycarboxylic acid, or a mixture of these are polymerized in the presence of from 0.2 to 25% by weight, based on the monomers, of a regulator. The sum of the mol % of a), b), c) and f) is always 100, and either or both of the components c) and f) is or are present in the monomer mixture in an amount of 0.1 mol %.

In the copolymerization of the monomers a) to f) or the homopolymerization of the monomers of group b), aqueous polymer solutions having a polymer content of not more than 70% by weight are obtained. It is of course also possible to prepare very dilute, eg. 1% strength, aqueous solutions, but for economic reasons the copolymerization is carried out in such a way that not less than 10% strength by weight aqueous copolymer solutions are prepared. After the copolymerization, the solutions can be brought to a pH of from 6.5 to 7, unless the polymerization has in any case been carried out in this range. The copolymers can be obtained by evaporating down the aqueous solutions. They have a low residual monomer content and are biodegradable. The biodegradability of the novel copolymers is up to 100%, as a rule from 20 to 95%, according to DIN 38,412, Part 24, Statistical Test (L25).

The copolymers are water-soluble. If they are water-insoluble in the free acid form, they can be converted into a water-soluble form by partial or complete neutralization with NaOH, KOH, ammonia or an amine. Copolymers or their alkali metal or ammonium salts, which have a solubility of not less than 20 g per liter in water at 20° C., are referred to as water-soluble in the present context.

The polymers described above are used as additives in detergents and cleaners. They may be added to powder or liquid formulations. The detergent and cleaner formulations are usually based on surfactants and, if required, builders. In the case of pure liquid detergents, the use of builders is generally dispensed with. Examples of suitable surfactants are anionic surfactants, such as $C_8$–$C_{12}$-alkylbenzenesulfonates, $C_{12}$–$C_{16}$-alkanesulfonates, $C_{12}$–$C_{16}$-alkylsulfates, $C_{12}$–$C_{16}$-alkylsulfosuccinates and sulfated oxyethylated $C_{12}$–$C_{16}$-alkanols, and nonionic surfactants, such as $C_8$–$C_{12}$-alkylphenol oxyethylates and $C_{12}$–$C_{20}$-alkanol oxyalkylates, and block copolymers of ethylene oxide and propylene oxide. The terminal groups of the polyalkylene oxides may be blocked. This means that the free OH groups of the polyalkylene oxides may be etherified, esterified, acetylated and/or aminated. In another possible method of modification, the free OH groups of the polyalkylene oxides are reacted with isocyanates.

The nonionic surfactants include $C_4$–$C_{18}$-alkylglucosides and the oxyalkylated products obtainable from these by oxyalkylation, in particular those which can be prepared by reacting alkylglucosides with ethylene oxide. The surfactants which can be used in detergents may also be zwitterionic and may be soaps. The surfactants are generally present in the detergent or cleaner in an amount of from 2 to 50, preferably from 5 to 45, % by weight.

The builders present in the detergent or cleaner are, for example, phosphates, for example orthophosphate, pyrophosphate and especially pentasodium triphosphate, zeolites, sodium carbonate, polycarboxylic acids, nitrilotriacetic acid, citric acid, tartaric acid, the salts of the stated acids and monomeric, oligomeric or polymeric phosphonates. The individual substances are used in different amounts for the preparation of the detergent formulations, for example sodium carbonate in amounts of not more than 80%, phosphates in amounts of not more than 45%, zeolites in amounts of not more than 40%, nitrilotriacetic acid and phosphates in amounts of not more than 10% and polycarboxylic acids in amounts of not more than 20%, based in each case on the weight of the substances and on the total detergent formulation. Because of the severe environmental pollution which results from the use of phosphates, the content of phosphates in detergents and cleaners is increasingly being reduced, so that detergents now contain not more than 25% of phosphate or preferably are even phosphate-free.

The polymers can also be used as additives in liquid detergents. Liquid detergents usually contain, as a component of the mixture, liquid or solid surfactants which are soluble or dispersible in the detergent formulation. Suitable surfactants for this purpose are the products which are also used in powder detergents, and liquid polyalkylene oxides or polyoxyalkylated compounds.

Detergent formulations may also contain corrosion inhibitors, such as silicates, as further additives. Examples of suitable silicates are sodium silicate, sodium disilicate and sodium metasilicate. The corrosion inhibitors may be present in amounts of not more than 25% by weight in the detergent and cleaner formulation. Other conventional additives in detergents and cleaners are bleaches, which may be present therein in an amount of not more than 30% by weight. Examples of suitable bleaches are perborates or chlorine-donating compounds, such as chloroisocyanurates. Another group of additives which may be present in detergents comprises antiredeposition agents. Known substances of this type are carboxymethylcellulose, methylcellulose, hydroxypropylmethylcellulose and graft polymers of vinyl acetate on polyalkylene oxides having a molecular weight of from 1,000 to 15,000. Antiredeposition agents may be present in the detergent formulation in amounts of not more than 5%. Further conventional additives in detergents, which may or may not be present therein, are optical brighteners, enzymes and perfume. The powder detergents may furthermore contain up to 50% by weight of a standardizing agent, such as sodium sulfate. The detergent formulations may be anhydrous or may contain small amounts, eg. not more than 10% by weight, of water. Liquid detergents usually contain not more than 80% by weight of water. Conventional detergent formulations are described in detail in, for example, German Laid-Open Application DOS 3,514,364, which is hereby incorporated by reference.

The homopolymers and copolymers described above can be added to all detergent and cleaner formulations. The amounts used for this purpose are from 0.5 to 25, preferably from 1 to 15, % by weight, based on the total formulation. The amounts of polymers used are in the great majority of cases preferably from 2 to 10% by weight, based on the detergent or cleaner mixture. The use of the additives employed according to the invention in phosphate-free and low-phosphate detergents and cleaners is of particular importance. The low-phosphate formulations contain not more than 25% by weight of pentasodium triphosphate or pyrophosphate. The copolymers are preferably used in phosphate-free formulations.

If desired, the polymers to be used according to the invention can be employed in detergent formulations together with known copolymers of acrylic acid and maleic acid or homopolymers of acrylic acid. The last-mentioned polymers have been used to date as incrustation inhibitors in detergent formulations. In addition to the abovementioned polymers, copolymers of $C_3$–$C_6$-mono- and dicarboxylic acids or maleic anhydride and $C_1$–$C_4$-alkyl vinyl ethers are also suitable. The molecular weight of the homopolymers and copolymers is from 1,000 to 100,000. If desired, these incrustation inhibitors can be used in detergents in an amount of not more than 10% by weight, based on the total formulation, in addition to the copolymers to be used according to the invention.

EXAMPLE 1

The polymerization apparatus consists of a 2 l glass reactor equipped with a stirrer, a thermometer, a nitrogen inlet tube and four feed vessels, one of which is heatable and stirrable.

Before the beginning of the polymerization, 1.05 moles of the dihydric alcohol stated in Table 1 and 0.2 g of p-toluenesulfonic acid are added to 2 moles (196 g) of MA (maleic anhydride) in the heatable feed vessel. The stirred mixture is heated at 80° C. for from 1 to 3 hours until complete esterification has taken place.

For the polymerization, 100 ml of water are initially taken in the reaction vessel and heated to 90° C. while the vessel is being flushed with nitrogen. Thereafter, the amounts of acrylic acid and 25% strength sodium hydroxide solution stated in Table 1, and the melt from the heatable feed vessel, are added in the course of four hours. Beginning at the same time as the monomer feed, the amounts of $H_2O_2$ and sodium persulfate stated in Table 1, which are dissolved in 200 ml of water, are added dropwise in the course of 5 1/4 hours. The resulting viscous aqueous solution is further polymerized for one hour at 90° C. after the end of the addition of the initiator. The aqueous solution is cooled and then brought to pH 6.5 with 50% strength aqueous sodium hydroxide solution. The starting materials, the K values and the data on the biodegradability of the copolymers are shown in Table 1.

TABLE 1

| Example No. | Preparation of comonomer b | | | Comonomer a | | 25% strength aqueous NaOH (g) | Initiator dissolved in 200 ml of $H_2O$ | | K value | Bio-degradability (%) |
|---|---|---|---|---|---|---|---|---|---|---|
| | b1 (mol) | b2 (mol) | comonomer b (mol %) | Acrylic acid (mol %) | (mol %) | | 100% $H_2O_2$ (g) | Na per-sulfate (g) | | |
| 1 | 2 MA | 1.05 ethylene glycol | 28.6 | 2.5 | 71.4 | 640 | 49.9 | 18.5 | 17.7 | 78 |
| 2 | 2 MA | 1.05 ethylene glycol | 33.3 | 2.0 | 66.7 | 560 | 45.7 | 16.9 | 16.8 | 77 |
| 3 | 2 MA | 1.05 ethylene glycol | 40.0 | 1.5 | 60.0 | 480 | 41.4 | 15.3 | 15.9 | 80 |
| 4 | 2 MA | 1.05 ethylene glycol | 50.0 | 1 | 50.0 | 400 | 37.2 | 13.8 | 12.9 | 82 |
| 5 | 2 MA | 1.05 butanediol | 22.4 | 2.75 | 78.6 | 680 | 51.9 | 19.2 | 19.4 | 73 |
| 6 | 2 MA | 1.05 triethylene glycol | 30.8 | 2.25 | 69.2 | 600 | 47.8 | 17.7 | 17.5 | 74 |
| 7 | 2 MA | 1.05 diethylene glycol | 36.4 | 1.75 | 63.6 | 520 | 43.5 | 16.2 | 15.4 | 76 |
| 8 | 2 MA | 1.05 $PEG_{300}$ | 44.4 | 1.25 | 55.5 | 440 | 39.3 | 14.6 | 14.7 | 80 |

$PEG_{300}$ = Polyethylene glycol having a mean molecular weight of 300

The copolymers can be added in the form of the free acids or in completely or partially neutralized form to the detergent formulations.

The K values stated in the Examples were determined according to H. Fikentscher, Cellulosechemie, 13 (1932), 58–64 and 71–74. K=k.$10^3$. The measurements were carried out in every case on the sodium salt in aqueous solution at 25° C., a pH of 7 and a concentration of 1% by weight of the sodium salt of the polymer.

EXAMPLES 9 to 13

In a 1 l glass reactor equipped with a stirrer, a thermometer, a nitrogen inlet tube, a condenser and two feed vessels, 2.2 moles (215.6 g) of MA, 0.2 g of p-toluenesulfonic acid and 100 ml of tetrahydrofuran are initially taken. The amount of polyhydric alcohol stated in Table 2 is added to the heated mixture, and careful flushing with nitrogen is carried out. Thereafter, the mixture is refluxed until the polyhydric alcohol has been completely esterified (1-5 hours). The mixture is cooled to 30° C., after which it is neutralized with 300 g of 25% strength aqueous sodium hydroxide solution (feed I), the tetrahydrofuran is distilled off with heating and flushing with nitrogen, and the residue is heated to 90° C. At this temperature, a solution of 25 g of sodium persulfate in 220 ml of 30% strength H₂O₂ is added dropwise in the course of 4 hours (feed II).

Polymerization is allowed to continue for a further 2 hours and the polymerization mixture is cooled and then brought to pH 7 with 25% strength sodium hydroxide solution.

The amounts of the monomers used, in mol %, the K values of the polymers and the residual maleic acid content and the data on biodegradability are summarized in Table 2.

omer a), 25% strength sodium hydroxide solution and H₂O₂ (in the form of a 30% strength aqueous solution) stated in Table 3 and are likewise blanketed with nitrogen.

For the polymerization, monomer a), the sodium hydroxide solution and monomer b) are then added dropwise in the course of 4 hours and, beginning at the same time, the H₂O₂ is added dropwise in the course of 5 hours. Polymerization is allowed to continue for 1 hour at 95° C., and the mixture is cooled and then brought to pH 7 with 50% strength sodium hydroxide solution.

Table 3 states the amounts of monomer used in each case, the K values of the water-soluble copolymers and the residual monomer content.

TABLE 3

| Example No. | Monomer a (mol); (mol %) | Monomer c (mol); (mol %) | Monomer b (mol); (mol %) | 25% strength NaOH (g) | Initiator H₂O₂ (% by wt.) | Residual content of MS (% by wt.) | K value |
|---|---|---|---|---|---|---|---|
| 14 | Acrylic acid 2; 62.5 | Maleic acid 0.2; 6.25 | Ethylene glycol dimaleate 1; 31.25 | 560 | 15 | 1.28 | 17.6 |
| 15 | Acrylic acid 1.25; 49 | Maleic acid 0.3; 11.75 | Ethylene glycol dimaleate 1; 39.25 | 440 | 22.5 | 0.08 | 14.7 |
| 16 | Methacrylic acid 2; 58.8 | Maleic acid 0.4; 11.75 | Triethylene glycol dimaleate 1; 29.45 | 240 | 16 | 0.30 | 15.8 |
| 17 | Acrylic acid 2; 60.6 | Citraconic acid 0.3; 9.1 | PEG₄₀₀ dimaleate 1; 30.3 | 240 | 10 | 0.01 | 18.9 |
| 18 | Acrylic acid 1.5; 71.4 | Maleic acid 0.1; 4.8 | Diethylene glycol dimaleate 0.5; 32.8 | 320 | 12 | 0.60 | 20.1 |
| 19 | Acrylic acid 2; 71.5 | Maleic acid 0.2; 7.1 | Glycerol trimaleate 0.6; 21.4 | 560 | 15 | 1.28 | 17.6 |
| 20 | Acrylic acid 1; 38.5 | Maleic acid 1; 38.5 | Diethylene glycol dimaleate 0.6; 23.0 | 230 | 12 | 0.15 | 12.9 |

PEG₄₀₀ = Polyethylene glycol having a mean molecular weight of 400

TABLE 2

| Example No. | Polyhydric alcohol (mol); (g) | Comonomer b (mol %) | Comonomer c MA (mol %) | K value | Residual MS[1] (%) | Biodegradability (%) |
|---|---|---|---|---|---|---|
| 9 | Ethylene glycol 1; 62 | 83.3 | 16.7 | 12.1 | 0.9 | 68 |
| 10 | Glycerol 0.5; 46 | 29.4 | 70.6 | 8.3 | 2.3 | 71 |
| 11 | Diethylene glycol 1; 106 | 83.3 | 16.7 | 11.3 | 0.8 | 66 |
| 12 | PEG₃₀₀[2] 0.5; 150 | 22.7 | 77.3 | 8.4 | 2.6 | 77 |
| 13 | Triethylene glycol 0.75; 78 | 51.7 | 48.3 | 10.8 | 1.2 | 63 |

[1]MS = Maleic acid
[2]PEG₃₀₀ = Polyethylene glycol having a molecular weight of 300
[3]MA = Maleic anhydride

EXAMPLES 14 TO 20

In a 2 l glass reactor equipped with a stirrer, a thermometer, a nitrogen inlet tube, a condenser and four feed vessels, the amounts (moles) of monomer c) stated in Table 3, in 100 ml of water, are initially taken and are heated with stirring and blanketing with nitrogen. At the same time, the amount of monomer b), likewise stated in Table 3, is introduced into the heatable feed vessel and heated to 60° C. The remaining three feed vessels are then each charged with the amounts of mon-

EXAMPLES 21 TO 24

In a 4 l glass reactor equipped with a stirrer, a thermometer, a nitrogen inlet tube and 6 feed vessels, one of which is heatable, 200 ml of water are initially taken and are heated to 90° C. with flushing with nitrogen. During this time, the feed vessels are filled as stated below:

Feed I: Solution of m moles of the comonomer f) stated in Table 4 in 2 moles of acrylic acid
Feed II: p moles of acrylic acid Feed III: Solution of q % by weight of regulator in 100 ml of water Feed IV (heatable): Melt of r moles of the dimaleate (comonomer b) stated in the Table at 60°-80° C.

Feed V: S g of 25% strength by weight aqueous sodium hydroxide solution

Feed VI: 25 g of sodium persulfate dissolved in 500 ml of 30% strength $H_2O_2$

At 90° C. and starting at the same time, feeds I and III are metered in over 2 h, feed IV in the course of 4 h and feed VI in the course of 5½ h. Two hours after the beginning of the monomer feed, feed II is added dropwise in the course of 2 h and feed V in the course of 3 h.

Thereafter, polymerization is allowed to continue for 1 hour and the mixture is cooled and then brought to pH 7 with 25% strength aqueous sodium hydroxide solution. Aqueous solutions of the sodium salt of the copolymers are obtained.

TABLE 4

| Example No. | Comonomer a 2 + p (mol); (mol %) | r (mol); (mol %) | m (mol); (mol %) | 25% strength NaOH g (% by wt.) | S (g) | K value |
|---|---|---|---|---|---|---|
| 21 | Acrylic acid 3.8; 78.35 | Ethylene glycol dimaleate 1; 20.6 | PEG$_{400}$ diacrylate 0.05; 1.05 | Mercaptoethanol 5 | 600 | 37.5 |
| 22 | Acrylic acid 3.8; 62.7 | Diethylene glycol dimaleate 2; 33.9 | Glycerol diacrylate 0.2; 3.4 | Thioglycolic acid 4 | 720 | 28.2 |
| 23 | Acrylic acid 3; 65.6 | Triethylene glycol dimaleate 1; 32.6 | Tetraethylene diacrylate 0.05; 1.6 | Mercaptoethanol 5 | 360 | 30.4 |
| 24 | Acrylic acid 4; 71.4 | PEG$_{300}$ dimaleate 1.5; 26.8 | PEG$_{1500}$ diacrylate 0.1; 1.8 | Hydroxyl ammonium sulfate 8 | 660 | 16.1 |

PEG$_x$ = Polyethylene glycol having a mean molecular weight of X

We claim:

1. A process for the preparation of a water-soluble polymer having a K value of from 5 to 100 (determined on the Na salt of the polymer according to H. Fikentscher in aqueous solution at 25° C, a pH of 7 and a concentration of 1% by weight of the Na salt of the polymer) by polymerizing a monomer mixture of
   (a) monoethylenically unsaturated $C_3$-$C_6$-monocarboxylic acids and
   (b) monomers which contain two or more ethylenically unsaturated double bonds linked via one or more ester or amide functions and which possess one or more —CO—OX groups, where X is one hydrogen equivalent, one alkali metal equivalent or one alkaline earth metal equivalent or an ammonium group, in aqueous solution in the presence of a polymerization initiator at not more than 200° C., wherein a monomer mixture which contains more than 20-100 mol % of (b) is polymerized in the presence of not more than 50% by weight, based on the monomers used, of a polymerization initiator.

2. A process as claimed in claim 1, wherein the monomer mixture polymerized additionally contains monomers selected from the group consisting of (c) from to 79.9 mol % of monoethylenically unsaturated $C_4$-$C_6$-dicarboxylic acids, (d) from 0 to 20 mol % of hydroxyalkyl esters, where the hydroxyalkyl group is of 2 to 6 carbon atoms, of monoethylenically unsaturated $C_3$-$C_6$-carboxylic acids, (e) from 0 to 30 mol % of other water-soluble, monoethylenically unsaturated monomers copolymerizable with monomers of groups (a) to (d), and (f) from 0 to 10 mol % of monomers which have two or more ethylenically unsaturated nonconjugated double bonds and differ from the monomers (b), the sum of the mol % for (a) to (f) always being 100 and one or more of the components (c) to (f) being present in the monomer mixture in an amount of 0.1 mol %.

3. A process as claimed in claim 1 or 2, wherein a monomer mixture of
   a) from 79.9 to 10 mol % of acrylic acid and/or methacrylic acid,
   b) from 20.1 to 90 mol % of a compound of the formula

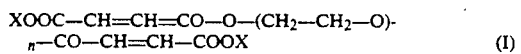

$$XOOC-CH=CH-CO-O-(CH_2-CH_2-O)_n-CO-CH=CH-COOX \quad (I)$$

where X is H, an alkali metal or an ammonium group and n is from 1 to 120, and c) from 0 to 69.9 mol % of maleic acid are preferably polymerized in the presence of not more than 30% by weight, based on the monomers used, of a polymerization initiator.

4. A process as claimed in claim 1 or 2, wherein a monomer mixture of
   a) from 79.9 to 10 mol % of acrylic acid and/or methacrylic acid,
   from 20.1 to 90 mol % of a compound of the formula

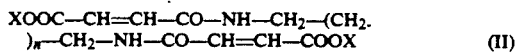

$$XOOC-CH=CH-CO-NH-CH_2-(CH_2)_n-CH_2-NH-CO-CH=CH-COOX \quad (II)$$

where X is H, an alkali metal or an ammonium group and n is from 0 to 4, and c) from 0 to 69.9 mol % of maleic acid is polymerized in the presence of not more than 30% by weight, based on the monomers used, of a polymerization initiator.

* * * * *